US010061125B2

(12) United States Patent
Hajimiri et al.

(10) Patent No.: US 10,061,125 B2
(45) Date of Patent: Aug. 28, 2018

(54) DIRECTIONAL OPTICAL RECEIVER

(71) Applicant: California Institute of Technology, Pasadena, CA (US)

(72) Inventors: Seyed Ali Hajimiri, La Canada, CA (US); Behrooz Abiri, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 120 days.

(21) Appl. No.: 14/703,737

(22) Filed: May 4, 2015

(65) Prior Publication Data

US 2016/0033766 A1    Feb. 4, 2016

Related U.S. Application Data

(60) Provisional application No. 61/947,929, filed on Mar. 4, 2014.

(51) Int. Cl.
*H04N 3/14* (2006.01)
*H04N 5/335* (2011.01)
(Continued)

(52) U.S. Cl.
CPC ....... *G02B 27/0087* (2013.01); *G02B 5/1842* (2013.01); *H04B 10/116* (2013.01); *H04N 5/378* (2013.01)

(58) Field of Classification Search
CPC ............... G02B 26/06; G02B 27/0087; G02B 27/4244; G02B 5/1828; G02B 5/1871;
(Continued)

(56) References Cited

U.S. PATENT DOCUMENTS 5,093,563 A    3/1992  Small et al.
5,113,286 A *  5/1992  Morrison ............. G02B 5/1857
                                                        359/569
(Continued)

FOREIGN PATENT DOCUMENTS

WO    WO 2014-031797 A1    2/2014

OTHER PUBLICATIONS

PCT Written Opinion of the International Searching Authority for application PCT/US2015/029110 dated Sep. 15, 2015.
(Continued)

*Primary Examiner* — Chia-Wei A Chen
(74) *Attorney, Agent, or Firm* — Alston & Bird LLP

(57) ABSTRACT

An optical phased array (OPA) receiver selectively detects, measures and differentiates between the amplitudes and directions of signals received from different directions. Because the OPA changes the direction that it looks toward electronically and without the use of any mechanical movements, the OPA is fast, has an enhanced sensitivity, and can be used in a wide variety applications, such as lens-free imaging systems. The OPA is adapted to dynamically control the array of optical elements and focus on the area of interest. The OPA achieves a higher numerical aperture compared to imaging systems that use conventional lens, thereby effectively maintaining a relatively large field of view and collection area concurrently. The OPA may be readily scaled by increasing its array size. Furthermore, because the OPA is relatively flat, it is ideally suited for small form factor applications such as cell phones and tablets.

24 Claims, 7 Drawing Sheets

(51) Int. Cl.
*G02F 1/03* (2006.01)
*G02F 1/07* (2006.01)
*G02F 1/23* (2006.01)
*G02F 1/01* (2006.01)
*G02B 27/00* (2006.01)
*G02B 5/18* (2006.01)
*H04N 5/378* (2011.01)
*H04B 10/116* (2013.01)

(58) Field of Classification Search
CPC ............... G02B 6/02195; G02B 6/122; G02B 6/29301; G02B 6/29322; A61B 6/06; A61B 6/4291; A61B 1/00096; A61B 3/102; G02F 1/2955; G02F 1/11; G01B 9/02091; G01N 21/4795; G01N 23/04; G01N 2223/419
USPC .................................................. 348/289–291
See application file for complete search history.

(56) References Cited

U.S. PATENT DOCUMENTS

| | | | | |
|---|---|---|---|---|
| 6,141,467 | A * | 10/2000 | Doerr | G02B 6/12033 385/24 |
| 6,285,810 | B1 * | 9/2001 | Fincato | G02F 1/3136 385/24 |
| 7,227,687 | B1 * | 6/2007 | Trisnadi | G02B 26/0841 359/237 |
| 7,492,871 | B2 * | 2/2009 | Popescu | A61B 6/00 378/145 |
| 2001/0036002 | A1 * | 11/2001 | Tearney | A61B 1/00183 359/287 |
| 2003/0152385 | A1 * | 8/2003 | Eldada | G02B 6/12004 398/34 |
| 2004/0165146 | A1 * | 8/2004 | Della Vecchia | A61B 3/12 351/221 |
| 2005/0190371 | A1 * | 9/2005 | Knuttel | G01B 11/24 356/479 |
| 2006/0083144 | A1 * | 4/2006 | Piede | G02F 1/025 369/100 |
| 2008/0204859 | A1 * | 8/2008 | Shu | G02B 6/02195 359/337.5 |
| 2008/0225144 | A1 | 9/2008 | Mauritzson et al. | |
| 2009/0034042 | A1 * | 2/2009 | Tholl | G02B 26/0875 |
| 2009/0128830 | A1 * | 5/2009 | Kottler | G01B 15/025 356/521 |
| 2010/0141829 | A1 | 6/2010 | Jalali et al. | |
| 2011/0080471 | A1 * | 4/2011 | Song | G01B 11/245 348/46 |
| 2011/0102804 | A1 * | 5/2011 | Lipson | G02B 6/12007 356/480 |
| 2012/0275564 | A1 * | 11/2012 | Hashimoto | A61B 6/484 378/62 |
| 2013/0142308 | A1 * | 6/2013 | Ishii | G01N 23/04 378/62 |
| 2013/0242400 | A1 * | 9/2013 | Chen | G01S 17/42 359/618 |
| 2013/0322892 | A1 | 12/2013 | Aflatouni et al. | |
| 2014/0003761 | A1 * | 1/2014 | Dong | G02F 1/2257 385/3 |
| 2014/0016182 | A1 * | 1/2014 | Hotta | G02F 1/2955 359/320 |
| 2014/0169524 | A1 * | 6/2014 | Sperl | G01N 23/046 378/62 |
| 2014/0192394 | A1 * | 7/2014 | Sun | G02B 6/26 359/289 |
| 2014/0252240 | A1 * | 9/2014 | Baker | G01N 23/005 250/370.05 |
| 2015/0208144 | A1 * | 7/2015 | Holmes | H04J 14/02 398/48 |
| 2015/0248015 | A1 * | 9/2015 | Schwedt | G02B 21/0032 359/226.1 |
| 2015/0285836 | A1 * | 10/2015 | Humphris | G01Q 10/045 850/1 |
| 2016/0231506 | A1 * | 8/2016 | Jiang | G02B 6/122 |

OTHER PUBLICATIONS

PCT International Preliminary Report on Patentability for application PCT/US2015/029110 dated Sep. 6, 2016.
PCT International Search Report for application PCT/US2015/029110 dated Sep. 15, 2015.

* cited by examiner

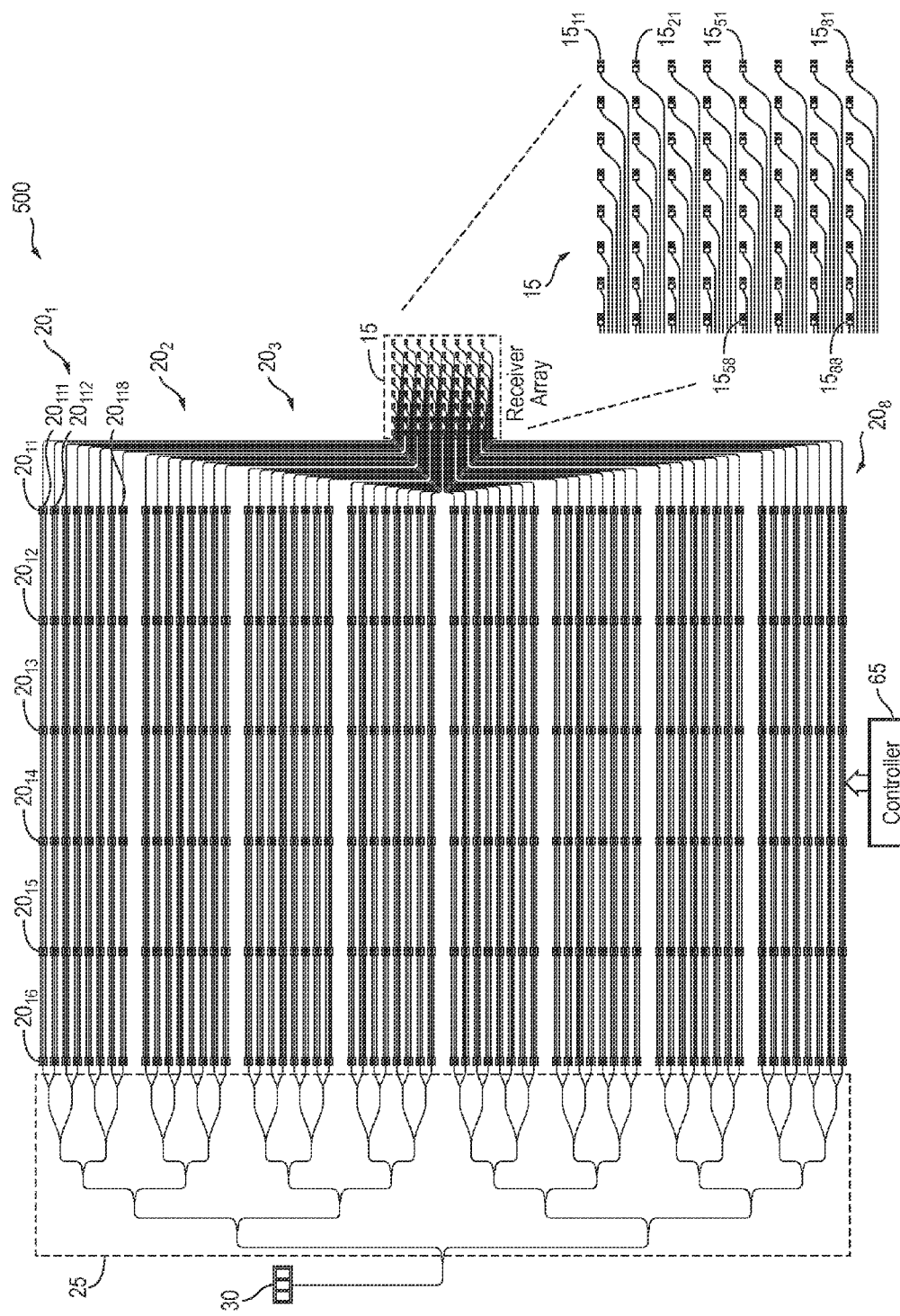

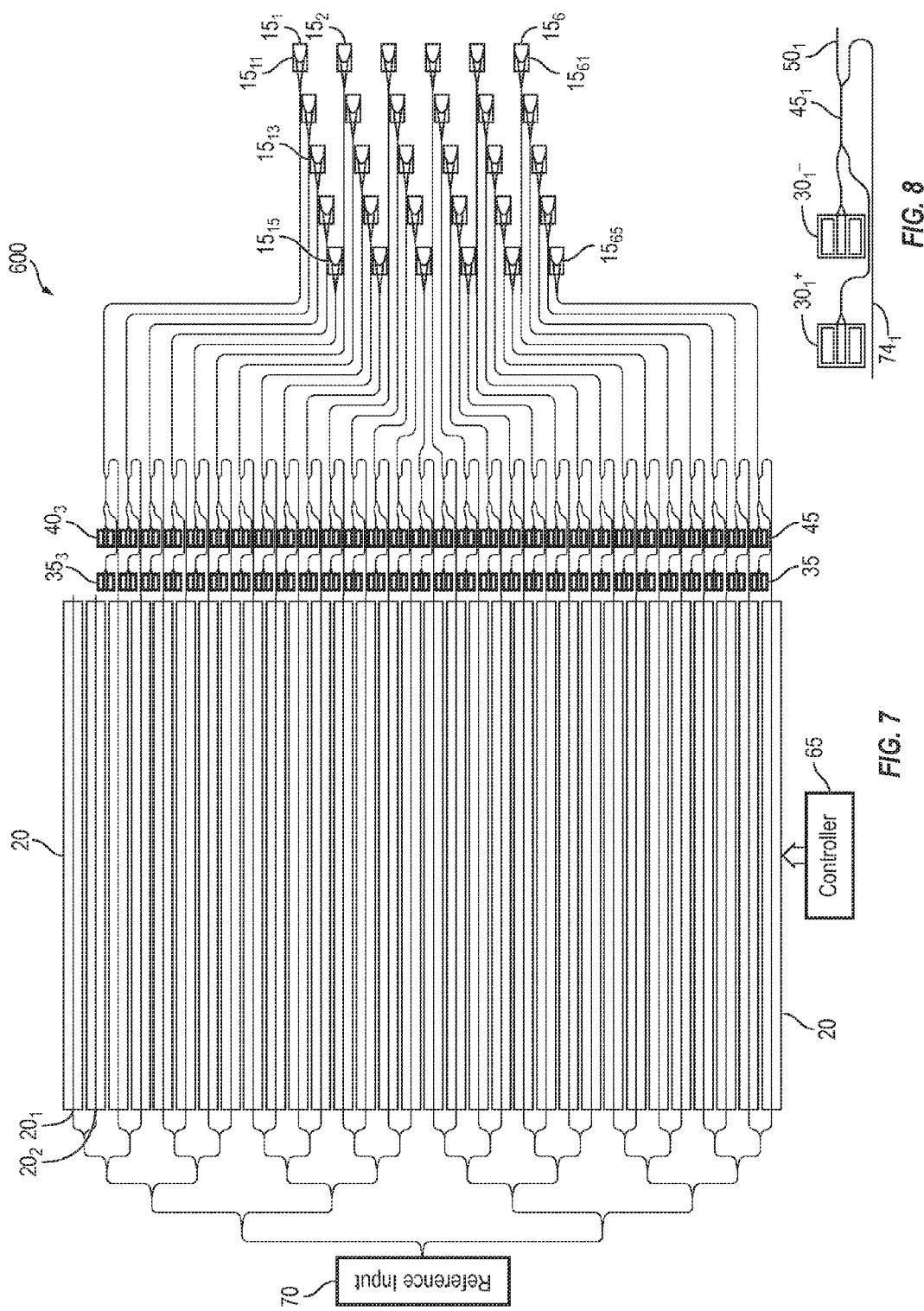

DIRECTIONAL OPTICAL RECEIVER

CROSS-REFERENCES TO RELATED APPLICATIONS

The present application claims benefit under 35 USC 119 (e) of U.S. provisional Application No. 61/947,929, filed Mar. 4, 2014, entitled "DIRECTIONAL OPTICAL RECEIVER", the content of which is incorporated herein by reference in its entirety.

BACKGROUND OF THE INVENTION

A conventional optical imaging system is adapted to map the brightness of various points of an object or a scene to a storage medium, such as a light sensitive film or a digital storage media. In a typical imaging system, a sensor (an array of light sensitive elements or photo-diodes, or film) performs the mapping operation. Such an imaging system includes a lens system that forms an image of the object on the sensor. Accordingly, each point of the object is uniquely mapped to a point on the sensor.

Another optical imaging system known in the prior art is commonly referred to as the compound eye. A compound eye includes multiple sensors each of which is arranged to receive the optical signal from a specific direction. Accordingly, each sensor detects the brightness of a specific point on the object but has limited collection area per sensor.

BRIEF SUMMARY OF THE INVENTION

An optical phased array receiver adapted to from an image of an object, in accordance with one embodiment of the present invention, includes, in part, a multitude of optical receiver elements receiving optical signals from the object, a multitude of phase shifters each associated with and receiving an optical signal from a different one of the optical receiver elements, a controller causing phase-shifted optical signals generated by the phase shifters to be substantially in phase, and at least one optical-to-electrical signal converter adapted to convert the multitude of phase-shifted optical signals to an electrical signal.

In one embodiment, each optical receiver element is an optical grating element. In one embodiment, each phase shifter may be a thermal phase shifter, a PIN phase shifter or a PN phase shifter. In one embodiment, the optical-to-electrical signal converter is a photo-diode. In one embodiment, the controller is adapted to control the phase of the phase shifters in accordance with a gradient decent algorithm. In one embodiment, the optical phased array receiver is adapted to perform horizontal and vertical scans to acquire the image of the object. In one embodiment In one embodiment, the controller is adapted to control the phases of the phase shifters in accordance with a direction in which the optical signals are received by the optical receiver elements.

A method of forming an image of an object, in accordance with one embodiment of the present invention, includes, in part, receiving a multitude of optical signals from the object, shifting phases of the optical signals to form a second multitude of optical signals that are substantially in phase with one another, and delivering the second multitude of optical signals to an optical-to-electrical signal converter adapted to generate an electrical signal from the received second multitude of optical signals.

An optical phased array receiver adapted to from an image of an object, in accordance with one embodiment of the present invention, includes, in part, a multitude of optical receiver elements each receiving an optical signal from the object, a multitude of phase shifters each associated with a different one of the optical receiver elements and adapted to shift a phase of a reference optical signal to generate an associated phase shifted reference optical signal, and a multitude of optical-to-electrical signal converters each associated with a different one of the optical receiver elements. Each optical-to-electrical signal converter is adapted to receive and convert the associated optical signal and the associated phase shifted reference optical signal to an electrical signal.

In one embodiment, the electrical signal generated by each optical-to-electrical signal converters has a frequency defined by a difference between the frequency of the associated optical signal and the frequency of the associated phase shifted reference optical signal. In on embodiment, the optical phased array receiver further includes, in part, a summing junction adapted to sum the electrical signals generated by the optical-to-electrical signal converters.

In one embodiment, the optical phased array further includes, in part, a controller adapted to shift the phases of the reference optical signals such that the electrical signals generated by the optical-to-electrical signal converters are substantially in phase. I one embodiment, the reference optical signal is a laser optical signal. In one embodiment, the optical phased array further includes, in part, a multitude of optical couplers each associated with a different one of the optical receiver elements and adapted to couple the associated phase-shifted reference optical signal with the associated optical signal and deliver the coupled optical signal to an associated optical-to-electrical signal converter.

In one embodiment, the optical phased array further includes, in part, a second multitude of optical-to-electrical signal converters each associated with a different one of the first multitude of optical-to-electrical signal converter and forming a complementary pair therewith. Each of the second multitude of optical-to-electrical signal converters receives the coupled optical signal from the associated optical coupler. In one embodiment, each optical receiver element is an optical grating element. In one embodiment, each phase shifters may be a thermal phase shifter, a PIN phase shifter or a PN phase shifter. In one embodiment, each optical-to-electrical signal converter is a photo-diode. In one embodiment, the controller is adapted to control the phase of each phase shifter in accordance with a gradient decent algorithm. In one embodiment, the optical phased array receiver is adapted to perform horizontal and vertical scans to form the image of the object. In one embodiment, the controller is adapted to control the phase of each of phase shifter in accordance with a direction in which the optical signals are received by the optical receiver elements.

A method of forming an image of an object, in accordance with one embodiment of the present invention, includes, in part, receiving optical signals from the object, shifting phases of a reference optical signal to form a first multitude of phase shifted reference optical signals each associated with a different one of the received optical signals, and delivering each optical signal and the optical signal's associated phase shifted reference optical signal to an associated optical-to-electrical signal converter.

BRIEF DESCRIPTION OF THE DRAWINGS

FIG. 6A is a top layout view of an optical phased array receiver, in accordance with another exemplary embodiment of the present invention.

FIG. 6B is an expanded top layout view of the optical receiver elements of the optical phased array receiver of FIG. 4A.

FIG. 7 is a top layout view of an optical phased array receiver, in accordance with another exemplary embodiment of the present invention.

FIG. 8 is a top layout view of a number of components disposed in the phased array receiver of FIG. 5.

DETAILED DESCRIPTION OF THE INVENTION

An optical phased array (OPA) receiver, in accordance with embodiments of the present invention, is adapted to selectively detect, measure and thus differentiate between the amplitudes and directions of signals received from different directions. Because an OPA, in accordance with embodiments of the present invention, is adapted to electronically and without the use of any mechanical movements, change the direction that the OPA looks at, the OPA operates relatively fast and can be used in a wide variety applications, such as lens-free imaging systems. A lens-free imaging system incorporating an OPA, in accordance with embodiments of the present invention, has an enhanced sensitivity compared to other lens-free approaches such as compound eyes. A lens-free imaging system incorporating an OPA, in accordance with embodiments of the present invention, is further adapted to dynamically control the array of optical elements, thereby providing the ability to image a small subsection of the field of view by dynamically focusing on one particular area of interest with higher sensitivity and accuracy.

Moreover, a lens-free imaging system incorporating an OPA, in accordance with embodiments of the present invention, achieves a higher numerical aperture compared to imaging systems that use conventional lens, thereby effectively maintaining a relatively large field of view and collection area concurrently. As is described further below, the sensitivity of an OPA receiver, in accordance with embodiments of the present invention, may be readily scaled by increasing the array size and the number of the optical receiver elements disposed therein. Furthermore, because an OPA, in accordance with embodiments of the present invention, is relatively flat—in contrast to compound eyes—the OPA is ideally suited for small form factor applications such as cell phones and tablets.

An OPA receiver, in accordance with one embodiment of the present invention, includes, in part, a multitude of optical receiver elements and phase shifters, as described further below. The OPA receiver selectively amplifies and adjust the phases of the incoming optical signals in accordance with the directions along which the optical signals are received. Moreover, the direction that an OPA receiver looks to detect the optical signal is programmable. The OPA receiver may thus be used, for example, as a lens-free imaging system by performing a series of horizontal or vertical scans (without any mechanical movements) across the object without any need for a change in illumination of the target. The OPA receiver may be arranged to form a one-dimensional, two-dimensional or a three-dimensional array.

Figure 1:
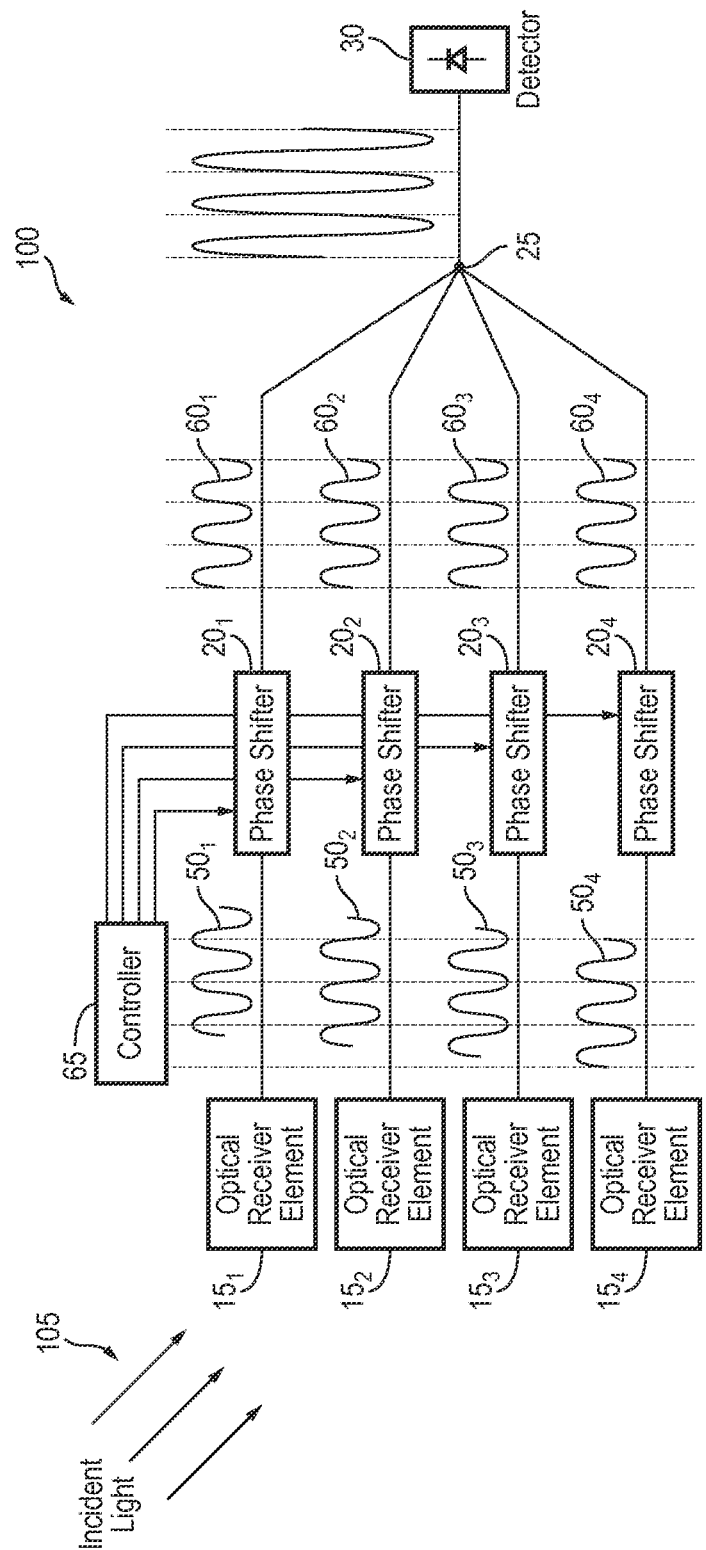
FIG. 1 is a simplified high-level schematic diagram of an optical phased array receiver, in accordance with one exemplary embodiment of the present invention.

FIG. 1 is a simplified high-level schematic diagram of an OPA receiver $100$, in accordance with one exemplary embodiment of the present invention. OPA receiver $100$ is shown as including, in part, four optical receiver elements (hereinafter alternatively referred to ORE) $15_1$, $15_2$, $15_3$, $15_4$, four associated phase shifters $20_1$, $20_2$, $20_3$, $20_4$ a controller $65$, a summing junction (alternatively referred to as power combiner) $25$ and an optical-to-electrical signal converter $30$ (such as a photo diode and alternatively referred to herein as such). Although OPA receiver $100$ is shown as having four optical receiver elements each having an associated phase shifter, it is understood that an OPA receiver, in accordance with embodiments of the present invention, may have any number of optical receiver elements and phase shifters. In one embodiment, all components of OPA receiver $100$ including the optical receiver elements, phase shifters, photo diode, controller and the waveguide through which the optical signals travel are integrated on a substrate such as semiconductor substrate.

OPA receiver $100$ is adapted to shift the phases of the optical signals received by the optical receiver elements $15_i$ (where i is an integer index ranging from 1 to 4 in this exemplary embodiment) so as to maximize the current supplied by optical-to-electrical signal generator $30$. For example, assume that the incoming light is received along direction $105$. Accordingly, optical signal $50_1$ received by ORE $15_1$ leads optical signal $50_2$ received by ORE $15_2$; optical signal $50_2$ received by ORE $15_2$ leads optical signal $50_3$ received by ORE $15_2$; and optical signal $50_3$ received by ORE $15_3$ leads optical signal $50_4$ received by ORE $15_4$. Controller $65$ is adapted to shift the phases of optical signals $50_1$, $50_2$, $50_3$, $50_4$ received by phase shifters $20_1$, $20_2$, $20_3$, $20_4$ so that optical signals $60_1$, $60_2$, $60_3$, $60_4$ generated respectively by phase shifters $20_1$, $20_2$, $20_3$, $20_4$ are substantially in phase with respect to one another. Optical signals $60_1$, $60_2$, $60_3$ and $60_4$ are added together by summing junction $25$ and then delivered to photo diode $30$. Because optical signals $60_1$, $60_2$, $60_3$ and $60_4$ are substantially in-phase with respect to one another, they are added constructively by summing junction $25$, thereby resulting in a highest amplitude of the current signal generated by photo diode $30$ relative to other instances when optical signals $60_1$, $60_2$, $60_3$ and $60_4$ are not all in phase.

Any optical receiver element adapted to collect and direct the incident light toward a waveguide may be used as an optical receiver element $15_i$. For example, in one embodiment, an optical grating or grating coupler may be used as an optical receiver element. Any phase shifter adapted to shift the phase of a received optical signal may be used as a phase shifter $20_i$. For example, in one embodiment, a thermal phase shifter may be to minimize the loss. In another embodiment, PIN diode may be used to inject carriers to change the index of refraction and thereby shift the phase of the optical signal. In yet another embodiment, a P-N may be used to modulate the width of the depletion region to change the index of refraction and hence shift the phase of the optical signal. Moreover, any element adapted to combine power, such as a series of Y-Junctions, or MMI couplers may be used.

As described above, because optical signals 60, have substantially the same phase, the amplitude of the optical signal at the output of power combiner 25 is defined by the sum of the amplitudes of optical signals $60_i$. Controller 65 may adjust the phases introduced by phase shifter $20_i$ in accordance with any number of algorithms so as to cause the optical signals $60_i$ to be substantially in phase, therefore to cause the current generated by photo diode 30 to be at a maximum value. For example, in one embodiment, controller 65 may implement a gradient decent algorithm, as is commonly known, to adjust the phases of phase shifter $20_i$. It is understood, however, that controller 65 may use any other suitable algorithm to adjust the phases introduced by phase shifters $20_i$.

As described above, although exemplary OPA receiver 100 is shown as having 4 optical receiver elements and 4 phase shifters, an OPA receiver, in accordance with embodiments of the present invention, may have any integer number of optical receiver elements and phase shifters. Assume that an OPA receiver, in accordance with an embodiment of the present invention, has N optical receiver elements and N phase shifters. If the N optical signals received by power combiner 25 are in phase and have the amplitude A, the optical signal received by photo diode 30 has an amplitude of NA and a power proportional $(NA)^2$. The intensity of the electrical signal at the output of the power combiner 25 may be defined as:

$$I(\alpha) = KI_0 G(\alpha) \frac{\text{Sin}^2 N(\alpha - \theta)}{\text{Sin}^2(\alpha - \theta)} \quad (1)$$

where K is a proportionality constant, $I_0$ is the intensity (power per unit area) incident on the optical receiver elements, $G(\alpha)$ is the beam profile of the optical receiver elements, $\alpha$ is the angle along which the incident light is received by the OPA receiver, and $\theta$ is the angle along which the OPA receiver is looking.

Figure 2:
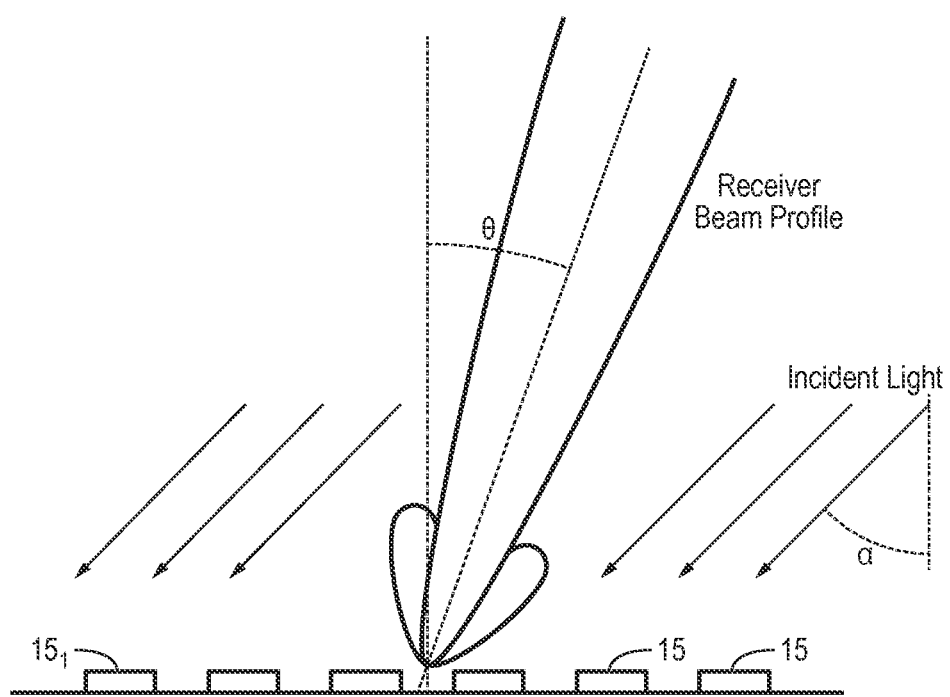
FIG. 2 shows an optical phased array receiver having a multitude of optical receiver elements with a beam profile that forms an angle θ relative to the vertical direction, in accordance with another exemplary embodiment of the present invention.

FIG. 2 shows an optical phased array receiver having a multitude of optical receiver elements 15 having a beam profile that forms an angle $\theta$ relative to the vertical direction. As is seen, the light incident on the optical receiver elements is shown as forming an angle $\alpha$ relative to the vertical direction.

From expression (1) it is seen that the higher the number N of optical receiver elements, the more is the drop in the light intensity as the light incident on the OPA receiver deviates from the desired angle. It is also seen from expression (1) that the higher the number of optical receiver elements, the higher is the sensitivity of the OPA receiver.

In one embodiment, the amount of phase delay that each phase shifter provides in response to the controller may be stored in a look-up table. To populate the look-up table, during a calibration phase, light may be directed toward the optical receiver elements from different directions. For each such direction, the delay provided by each phase shifter is varied so as to achieve a relative maximum current value from the photo diode. Accordingly, during the calibration phase, for each direction along which the light is received, a set of values are stored in the look-up table defining the amount of phase that the phase shifters will be required to provide. During actual operation when the OPA receiver performs horizontal and vertical scanning to acquire an object image, the controller causes the phase shifters to introduce the right amount of delay in accordance with the look-up table values matching the direction along which the light is received.

In one embodiment, a digital display screen panel may be used for such a calibration. To achieve this, at any given time, one or a group of pixels positioned within a small area are turned on. The delays introduced by the phase shifters are then varied until a relatively maximum current value is generated by the photo diode. The delays causing such maximum current value are associated with the direction from which the digital display screen light is received and then stored in a corresponding address in the look-up table. Next, the first group of pixels are turned off and another neighboring group of pixels of the digital display screen panel are turned on. The phase delays causing the photo detector to generate a maximum current value is then associated with the direction from which the on pixels are located and stored in a corresponding entry in the look-up table. This process is repeated for all other groups of digital display screen pixels to populate the look-up table.

Figure 3:
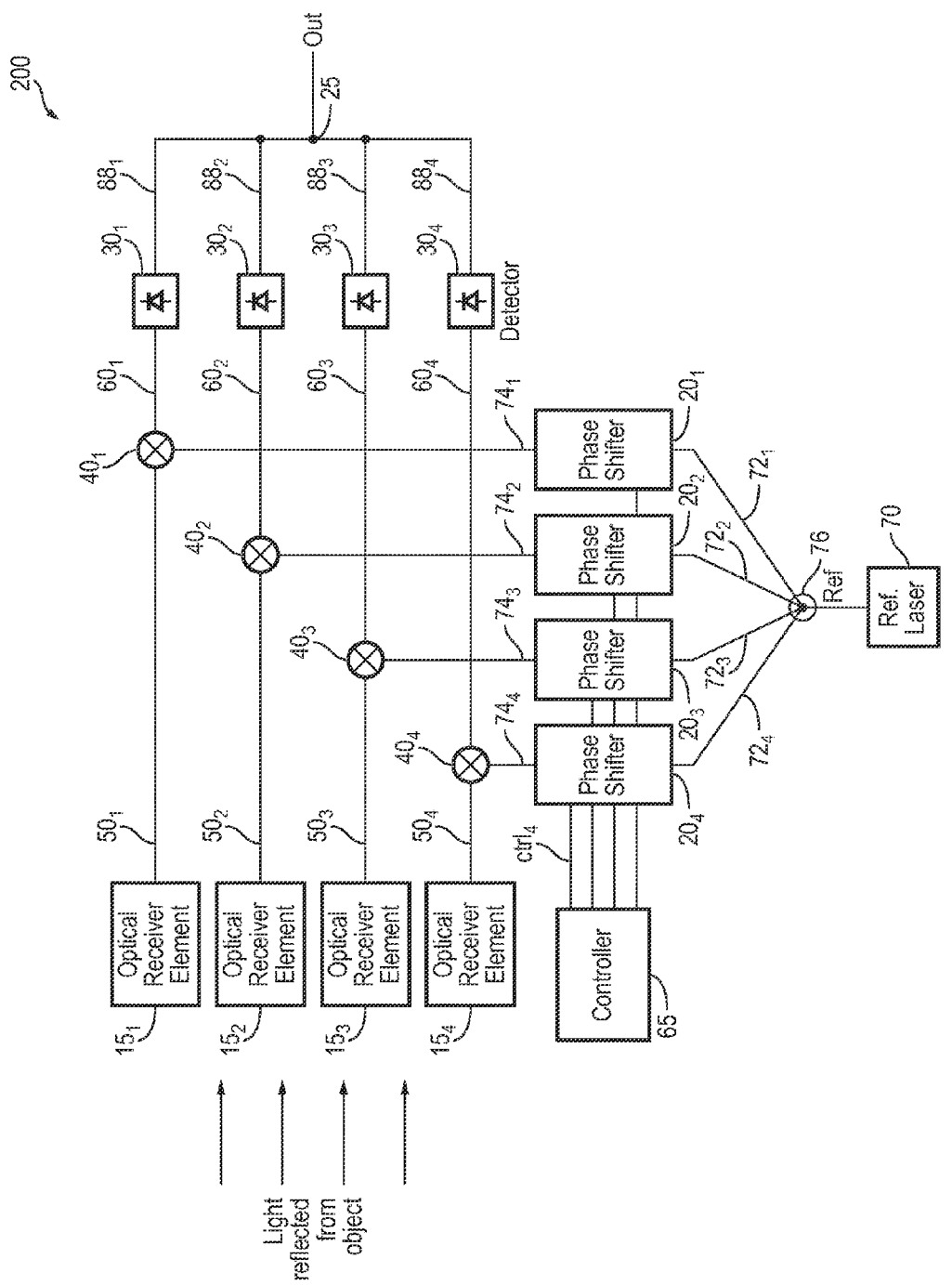
FIG. 3 is a simplified high-level schematic diagram of an optical phased array receiver, in accordance with another exemplary embodiment of the present invention.

FIG. 3 is a simplified high-level schematic diagram of an OPA receiver 200, in accordance with another exemplary embodiment of the present invention. OPA receiver 200 is shown as including, in part, four optical receiver elements $15_1$, $15_2$, $15_3$, $15_4$ (alternatively referred to herein as optical receiver element $15_i$), four associated frequency converters (mixers) $40_1$, $40_2$, $40_3$, $40_4$ (alternatively referred to herein as frequency converter $40_i$), four associated phase shifters $20_1$, $20_2$, $20_3$, $20_4$ (alternatively referred to herein as phase shifter $20_i$), a controller 65, a reference optical signal source (such as a laser) 70, and four associated optical-to-electrical signal converters $30_1$, $30_2$, $30_3$, $30_4$ (alternatively referred to herein as photo diode $30_i$). Although OPA receiver 200 is shown as having four optical receiver elements each having an associated phase shifter, a mixer, and a photo diode, it is understood that an OPA receiver, in accordance with embodiments of the present invention, may have any number of optical receiver elements, phase shifters, mixers and photo diodes. As is described further below, OPA receiver 200 has an enhanced sensitivity and a reduced 1/f noise compared to OPA receiver 100. In one embodiment, all components of OPA receiver 200 including the optical receiver elements, phase shifters, mixers, photo diodes, controller and the waveguide through which the optical signals travel are integrated on a substrate such as semiconductor substrate.

OPA receiver 200 is adapted to shift the phases of the optical signals received by the optical receiver elements $15_i$ (where i is an integer index ranging from 1 to 4 in this exemplary embodiment) so as to maximize the currents supplied by photo diodes $30_i$. To achieve this, the reference optical signal Ref supplied by laser 70 is split by optical splitter 76 into four reference optical signals $72_1$, $72_2$, $72_3$, and $72_4$ (alternatively referred to herein as reference optical signal $72_i$). Each phase shifter $20_i$ is adapted to change the phase of the associated reference optical signal 72, in response to the associated control signal Ctrl, the phase shifter receives from controller 65, thereby to generate a phase-shifted reference optical signal $74_1$, $74_2$, $74_3$, $74_4$ (alternatively referred to herein as reference optical signal $74_1$). Accordingly, control signals $Ctrl_i$ (generated by controller 65) adjust phase shifters 20, such that the phases of associated optical signals $74_i$ correspond to the phases of the received optical signals $50_i$.

Each mixer $40_i$, is adapted to mix the received optical signal $50_i$ with an associated phase-shifted reference optical signal $74_i$ to generate a beat signal $60_i$ that the mixer delivers to an associated photo diode $30_i$. Beat signal $60_i$ has a frequency defined by the difference between the frequency of received optical signal $50_i$ and the frequency of the optical signal generated by reference laser 70.

Controller 65 is adapted to shift the phases of reference optical signals 72, such that beat signals $60_i$ have substantially the same phase. Accordingly, electrical signals $88_i$ (generated by photo diodes $30_i$) are also in phase thus causing the amplitude of the electrical current signal OUT at the output of power combiner 25 to be defined by the sum of the amplitudes of electrical current signals $88_i$. In other words, the degree of phase shift introduced in each phase shifter $20_i$ by controller 65 is such that along the desired direction of observation by OPA receiver 200, the time varying currents $88_i$ are substantially in-phase. Therefore, power combiner 25 may simply be a node receiving current signals $88_i$ and delivering their sum as output current signal OUT which may be defined as:

$$I(\alpha) = K\sqrt{\frac{1}{N}I_{ref}I_0}\ G(\alpha)\cos(2\pi(f_2 - f_1))\frac{\text{Sin}^2 N(\alpha - \theta)}{\text{Sin}^2(\alpha - \theta)} \qquad (2)$$

In expression (2), $I(\alpha)$ represents the magnitude of the output current signal OUT, K is a proportionality constant, $\alpha$ is the angle along which the incident light is received by OPA receiver 200, N is the number of optical receiver elements, $I_0$ represents the intensity of the received optical signal, $I_{ref}$ represent the intensity of the laser beam, $G(\alpha)$ is the beam profile of the optical receiver elements, $\theta$ is the angle along which the OPA receiver is looking, $f_2$ is the frequency of the laser source, and $f_1$ is the frequency of the received optical signal. Because the output current is centered at the frequency $(f_2-f_1)$, the degradation of the signal-to-noise ratio (SNR) due to the 1/f is significantly reduced. Furthermore, to the extent that the output current signal is proportional to the square root of the product of the powers of the incoming optical signal and the reference signal, the SNR and hence the sensitivity of the OPA receiver 200 may be enhanced by increasing the power of the optical signal generated by laser source 70.

Figure 4:
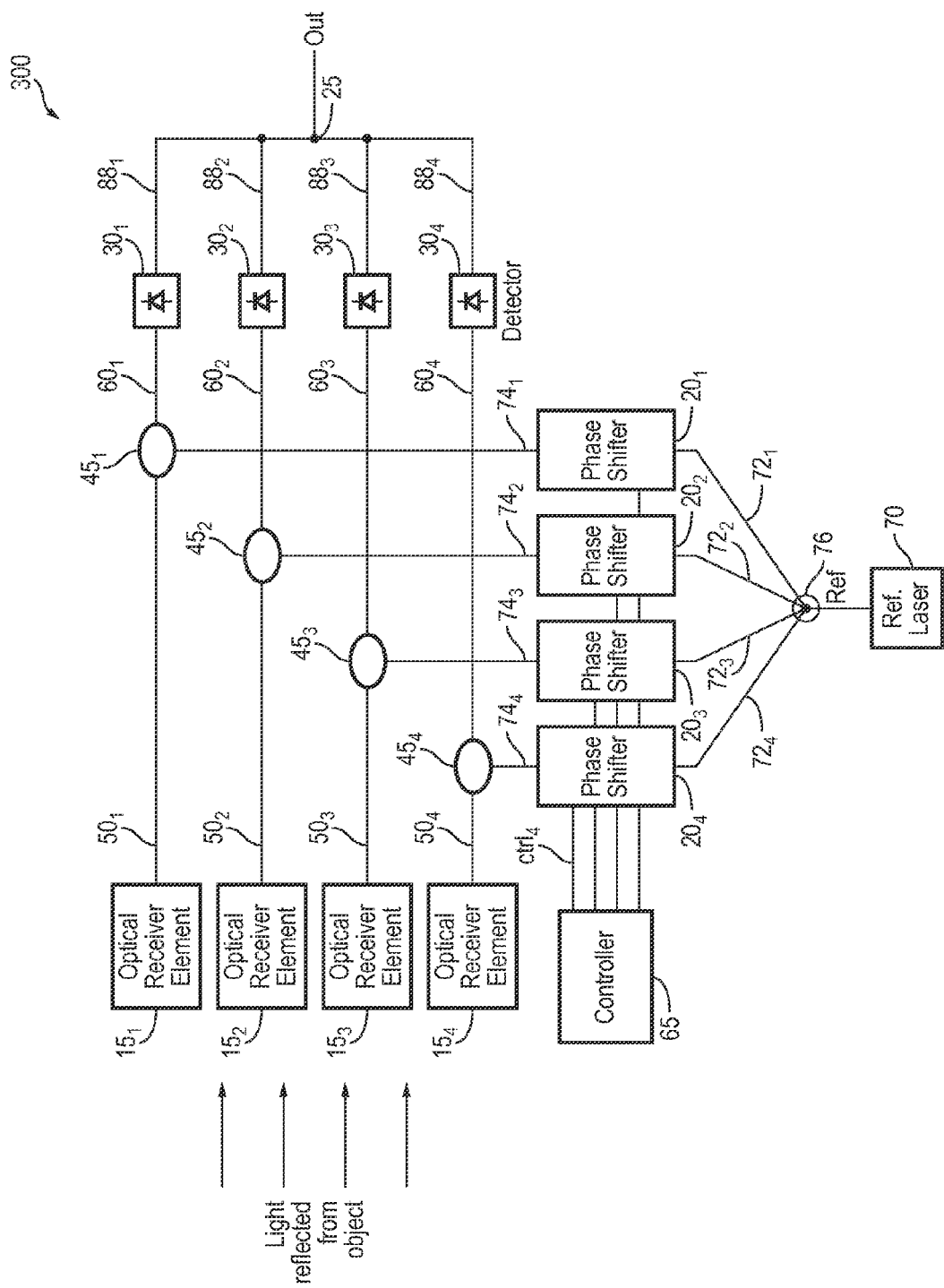
FIG. 4 is a simplified high-level schematic diagram of an optical phased array receiver, in accordance with another exemplary embodiment of the present invention.

FIG. 4 is a simplified high-level schematic diagram of an OPA receiver 300, in accordance with another exemplary embodiment of the present invention. OPA receiver 300 is similar to OPA receiver 200 except that in OPA 300, photo diodes $30_i$, are adapted to perform both mixing operation as well as optical-to-electrical signal conversion. Each optical coupler $45_i$, is adapted to couple the associated received optical signal $50_i$, with the associated phase-shifted reference optical signal $74_i$, and deliver the coupled signal $60_i$, to the associated photo-diode $30_i$. The frequency of the electrical signal generated by each photo diode $30_i$, is defined by a difference between the frequency of the associated received optical signal $50_i$, and the frequency of the associated phase-shifted reference optical signal $74_i$.

Figure 5:
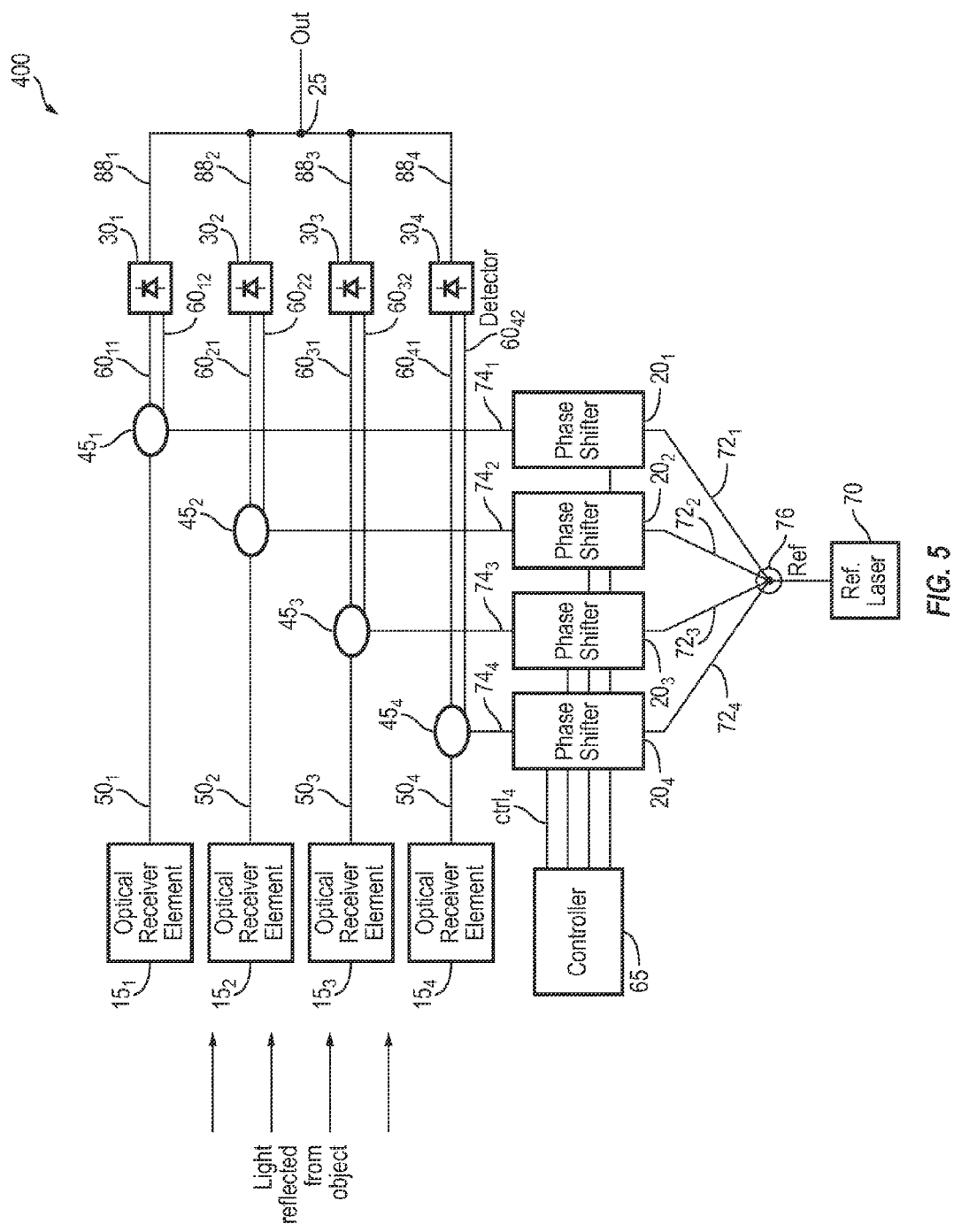
FIG. 5 is a simplified high-level schematic diagram of an optical phased array receiver, in accordance with another exemplary embodiment of the present invention.

FIG. 5 is a simplified high-level schematic diagram of an OPA receiver 400, in accordance with another exemplary embodiment of the present invention. OPA receiver 400 is similar to OPA receiver 300 except that in OPA 400, each optical coupler $45_i$, supplies two optical signals $60_{i1}$ and $60_{i2}$ delivered to a pair of complementary photo diodes $30_i^+$ and $30_i^-$ disposed in photo-diode block $30_i$, (for simplicity and clarity only one such photo diode is shown inside each photo diode block $30_i$). Each such photo diode is adapted to perform both mixing operation as well as optical-to-electrical signal conversion. Each optical coupler $45_i$, is adapted to couple the associated received optical signal $50_i$, with the associated phase-shifted reference optical signal $74_i$ to generate a pair of associated coupled signals $60_{i1}$ and $60_{i2}$. The frequency of the electrical signal generated by each such photo diode is defined by a difference between the frequency of the associated received optical signal $50_i$ and the frequency of the associated phase-shifted reference optical signal $74_i$.

FIG. 6A is a top layout view of an exemplary embodiment of an OPA receiver 500, in accordance with one embodiment of the present invention. OPA receiver 500 includes 64 optical receiver elements but has otherwise a schematic diagram corresponding to that shown in FIG. 1. OPA receiver 500 is shown as including, in part, a two-dimensional eight-by-eight array of optical receiver elements, collectively identified using reference number 15.

FIG. 6B is an expanded top layout view of optical receiver elements 15 of FIG. 6A. Referring concurrently to FIGS. 6A and 6B, for simplicity and clarity only six of the optical receiver elements $15_{11}$ $15_{21}$, $15_{51}$, $15_{58}$, $15_{81}$, and $15_{88}$ are identified in FIG. 6B. It is understood that in optical receiver element $15_{jk}$, indices j and k respectively refer to the row and column number in which the optical receiver elements is disposed. It is further understood that in this exemplary embodiment, j and k range from 1 to 8.

OPA receiver 500 is also shown as including, in part, 8 rows of phase shifters $20_j$ each arranged along six columns, with each column having disposed therein 8 phase shifters. For example, row $20_1$ is shown as including six columns $20_{11}$, $20_{12}$, $20_{13}$, $20_{14}$, $20_{15}$, $20_{16}$. Column $20_{11}$ is shown as including 8 phase shifters associated with row $20_j$ only three of which, namely phase shifters $20_{111}$, $20_{112}$ and $20_{118}$ are identified for simplicity. Accordingly, in OPA 300, the phase of the optical signal received by each optical receiver element may be controlled via six phases shifters.

OPA receiver 500 is also shown as including, in part, a power combiner 25 that includes a multitude of waveguides adapted to combine and deliver to photo diode 30 the optical signals supplied by the phase shifters. For example, referring to FIG. 6A, the optical signal supplied by phase shifters disposed in row $20_1$ are combined with the optical signal supplied by phase shifters disposed in row $20_2$ using a multitude of waveguides. In a similar manner, the optical signal supplied by phase shifters disposed in row $20_j$ are combined with the optical signal supplied by phase shifters disposed in row $20_{j+1}$. The four resulting signals are subsequently directed in the waveguides and combined as shown to generate a combined signal that is delivered to photo diode 30. Although, the optical power in the waveguides are shown as being combined using a multitude of Y-Junctions, it is understood that the powers may be combined using any other power combining structures, such as star or MMI (multi-mode interference) couplers. Controller 65 is adapted to control the phases of the phase shifters, as described above.

FIG. 7 is a top layout view of an exemplary embodiment of an OPA receiver 600, in accordance with one embodiment of the present invention. OPA receiver 600 is shown as including 30 optical receiver elements but has otherwise a schematic diagram corresponding to that shown in FIG. 5. OPA receiver 600 is shown as including, in part, a two-dimensional six-by-five array of optical receiver elements, collectively identified using reference number 15. For simplicity and clarity only five such optical receiver elements $15_{11}$ $15_{13}$, $15_{15}$ (disposed in row $15_1$) and $15_{61}$, $15_{65}$ disposed in row $15_6$ are identified in FIG. 5. It is understood that for optical receiver element $15_{jk}$, indices j and k respectively refer to the row and column number in which the optical receiver elements is disposed. It is further understood that in this exemplary embodiment, j ranges from 1 to 6, and k ranges from 1 to 5.

OPA receiver 600 is also shown as including, in part, a multitude of phase shifters arranged along 32 rows and collectively identified using reference number 20. The optical signal generated by laser source 70 is split into 32 optical signals each delivered to a different one of the row of phase shifters. The phase shifters disposed along rows $20_1$ and $20_2$ are not used in this exemplary embodiment. Disposed along each row $20_n$ (n is an index ranging from 3 to 32) and arranged in columns 35 and 45 is an optical coupler and a pair of photo diodes performing mixing and optical-to-electrical signal conversion, as described further below. Controller 65 is adapted to control the phases of the phase shifters, as described above.

FIG. 8 is a top layout view of the components disposed at the intersection of any of row $20_3$ and column 35, 45. It is understood that similar components are disposed at the intersections of any row $20_n$ and columns 35, 45. Blocks $35_3$ is shown as including a photo-detector $30_1^+$ and block $45_3$ is shown as including a photo-detector $30_1^-$. Signal $74_i$ (generated by shifting the phase of optical signal $72_i$ generated by laser 70 as shown, for example, in FIG. 5) and signal $50_1$ (delivered by optical receiver element $15_{11}$) are combined by 50/50 optical coupler $45_1$ and delivered to both photo-detectors $30_1^+$ and $30_1^-$ in photo-diode block $30_1$ (see for example FIG. 5). Each of photo-diodes $30_1^+$ and $30_1^-$ generates an electrical current signal representative of the square of the amplitude of the optical signal the photo-diode receives. The output signals of photo-diodes $30_1^+$ and $30_1^-$ are complementary one of which is a differentially positive signal and the other one of which is a differentially negative signal. The currents generated by all photo-diodes $30_n^+$ generating differentially positive signals are added together to generate a differentially positive output current signal $I_{OUT}^+$ (not shown). Likewise, the currents generated by all photo-diodes $30_n^-$ generating differentially negative signals are added together to generate a differentially negative output current signal $I_{OUT}^-$ (not shown). Differential current signals $I_{OUT}^-$ and $I_{OUT}^-$ are representative of the image being captured.

The above embodiments of the present invention are illustrative and not limitative. Embodiments of the present invention are not limited by the type or the number of optical receiver elements, phase shifter, optical splitter/coupler, waveguide, mixer or optical-to-electrical signal converter disposed in the optical phased array. Embodiments of the present invention are not limited by the type of substrate, semiconductor, flexible or otherwise, in which various components of an optical phased array in accordance with the present invention may be embodied. Other additions, subtractions or modifications are obvious in view of the present disclosure and are intended to fall within the scope of the appended claims.

What is claimed is:

1. An optical phased array receiver adapted to form an image of an object, the optical phased array receiver comprising:
    a plurality of optical receiver elements each receiving an optical signal from the object;
    a plurality of phase shifters each associated with a different one of the plurality of optical receiver elements and adapted to shift a phase of a reference optical signal to generate an associated phase shifted reference optical signal; and
    a first plurality of optical-to-electrical signal converters each associated with a different one of the optical receiver elements, each of the first plurality of optical-to-electrical signal converters adapted to receive and convert the associated optical signal and the associated phase shifted reference optical signal to an electrical signal, wherein the electrical signal generated by each of the first plurality of optical-to-electrical signal converters has a frequency defined by a difference between a frequency of the associated optical signal and a frequency of the associated phase shifted reference optical signal.

2. The optical phased array receiver of claim 1 further comprising:
    a summing junction adapted to sum the electrical signals generated by the first plurality of optical-to-electrical signal converters.

3. The optical phased array receiver of claim 2 further comprising:
    a controller adapted to shift the phases of the reference optical signals such that the electrical signals generated by the first plurality of optical-to-electrical signal converters are in phase.

4. The optical phased array receiver of claim 3 wherein said reference optical signal is a laser optical signal.

5. The optical phased array receiver of claim 4 further comprising:
    a plurality of optical couplers each associated with a different one of the optical receiver elements and adapted to couple the associated phase-shifted reference optical signal with the associated optical signal and deliver the coupled optical signal to an associated optical-to-electrical signal converter.

6. The optical phased array receiver of claim 5 further comprising:
    a second plurality of optical-to-electrical signal converters each associated with a different one of the first plurality of optical-to-electrical signal converter and forming a complementary pair therewith, each of the second plurality of optical-to-electrical signal converters receiving the coupled optical signal from the associated optical coupler.

7. The optical phased array receiver of claim 1 wherein each of the plurality of optical receiver element is an optical grating element.

8. The optical phased array receiver of claim 1 wherein each of the plurality of phase shifters is selected from a group consisting of a thermal phase shifter, a PIN phase shifter and a PN phase shifter.

9. The optical phased array receiver of claim 1 wherein each of said first plurality of optical-to-electrical signal converters is a photo-diode.

10. The optical phased array receiver of claim 1 wherein said controller is adapted to control a phase of each of the plurality of phase shifters in accordance with a gradient decent algorithm.

11. The optical phased array receiver of claim 1 wherein said optical phased array receiver is adapted to perform horizontal and vertical scans to form the image of the object.

12. The optical phased array receiver of claim 1 wherein said controller is adapted to control a phase of each of the plurality of phase shifters in accordance with a direction in which the optical signals are received by the plurality of optical receiver elements.

13. A method of forming an image of an object, the method comprising:
- receiving a first plurality of optical signals from the object;
- shifting phases of a reference optical signal to form a first plurality of phase shifted reference optical signals each associated with a different one of the first plurality of optical signals; and
- delivering each of a different one of the first plurality of optical signals and the associated phase shifted reference optical signal to an associated one of a first plurality of optical-to-electrical signal converter, wherein an electrical signal generated by each of the first plurality of optical-to-electrical signal converters has a frequency defined by a difference between a frequency of the associated optical signal and a frequency of the associated phase shifted reference optical signal.

14. The method of claim 13 further comprising:
- summing the electrical signals generated by first plurality of optical-to-electrical signal converters.

15. The method of claim 14 further comprising:
- shifting the phases of the reference optical signals such that the electrical signals generated by the first plurality of optical-to-electrical signal are in phase.

16. The method of claim 15 wherein said reference optical signal is a laser optical signal.

17. The method of claim 16 further comprising:
- coupling the associated phase-shifted reference optical signal with the associated optical signal to generate a first associated coupled optical signal; and
- delivering the first associated coupled optical signal to an associated one of the first plurality of optical-to-electrical signal converters.

18. The method of claim 17 further comprising:
- coupling the associated phase-shifted reference optical signal with the associated optical signal to generate a second associated coupled optical signal; and
- delivering the second associated coupled optical signal to an associated one of a second plurality of optical-to-electrical signal converters forming a complementary pair with the associated on of the first plurality of optical-to-electrical signal converters.

19. The method of claim 13 wherein each of the plurality of optical receiver element is an optical grating element.

20. The method of claim 13 wherein each of the plurality of phase shifters is selected from a group consisting of a thermal phase shifter, a PIN phase shifter and a PN phase shifter.

21. The method of claim 13 wherein each of said first plurality of optical-to-electrical signal converters is a photodiode.

22. The method of claim 13 further comprising:
- controlling a phase of each of the plurality of phase shifters in accordance with a gradient decent algorithm.

23. The method of claim 13 further comprising:
- performing horizontal and vertical scans to form the image of the object.

24. The method of claim 13 further comprising:
- controlling a phase of each of the plurality of phase shifters in accordance with a direction in which the optical signals are received by the plurality of optical receiver elements.

* * * * *